(12) United States Patent
Whitmore, Jr. et al.

(10) Patent No.: US 9,453,930 B2
(45) Date of Patent: Sep. 27, 2016

(54) SYSTEMS AND METHODS FOR HIGH-RESOLUTION IMAGING USING SEPARATED WAVEFIELDS

(71) Applicant: PGS Geophyscial AS, Lysaker (NO)

(72) Inventors: Norman Daniel Whitmore, Jr., Houston, TX (US); Shaoping Lu, Houston, TX (US)

(73) Assignee: PGS GEOPHYSICAL AS, Oslo (NO)

( * ) Notice: Subject to any disclaimer, the term of this patent is extended or adjusted under 35 U.S.C. 154(b) by 291 days.

(21) Appl. No.: 14/044,203

(22) Filed: Oct. 2, 2013

(65) Prior Publication Data
US 2014/0119157 A1 May 1, 2014

Related U.S. Application Data

(60) Provisional application No. 61/721,327, filed on Nov. 1, 2012.

(51) Int. Cl.
*G01V 1/30* (2006.01)
*G01V 1/38* (2006.01)
*G01V 1/36* (2006.01)

(52) U.S. Cl.
CPC ............ *G01V 1/38* (2013.01); *G01V 1/362* (2013.01)

(58) Field of Classification Search
CPC ................................ G01V 1/38; G01V 1/362
USPC .................................................. 367/7, 11, 16
See application file for complete search history.

(56) References Cited

U.S. PATENT DOCUMENTS

| 4,594,693 A | 6/1986 | Pann et al. | |
|---|---|---|---|
| 5,450,370 A * | 9/1995 | Beasley | G01V 1/362 367/53 |
| 7,035,737 B2 | 4/2006 | Ren | |
| 7,257,492 B2 * | 8/2007 | Moore | G01V 1/362 702/17 |
| 2011/0305109 A1 * | 12/2011 | Soubaras | G01V 1/28 367/24 |
| 2012/0113750 A1 | 5/2012 | Al-Monin et al. | |
| 2012/0250456 A1 | 10/2012 | Tenghamn | |
| 2012/0307591 A1 | 12/2012 | Hegna et al. | |

FOREIGN PATENT DOCUMENTS

| EP | 2530491 A2 | 5/2012 | |
| NO | GB 2448415 A * | 10/2008 | ............... G01V 1/36 |
| WO | 0016127 A1 | 3/2000 | |

OTHER PUBLICATIONS

Spitz, S., "Seismic trace interpolation in the F-X domain," Geophysics, vol. 56, No. 6, Jun. 1991, pp. 785-794.

(Continued)

*Primary Examiner* — Daniel L Murphy

(57) ABSTRACT

This disclosure presents computational systems and methods for obtaining high-resolution, three-dimensional seismic images of a region of a subterranean formation using separated up-going and down-going wavefields that include primary and multiple reflections obtained by processing dual-sensor towed streamer seismic data. The inclusion of multiple reflections reduces acquisition footprints in migration of the seismic data. The computational systems and methods produce high-resolution images in a region of a subterranean formation that lies below a body of water. The methods and systems employ a digitally encoded wavefields constructed from a discrete sampling of a two-dimensional slice of a three-dimensional wavefield and stored in one or more tangible, physical data-storage devices.

31 Claims, 17 Drawing Sheets

(56) References Cited

OTHER PUBLICATIONS

Verschuur, Dirk Jacob, "Surface-Related Multiple elimination, an Inversion Approach," Delft University of Technology, Dec. 1991, pp. 1-247.

Van Borselen, R.G., et al., "Seismic Processing 2: Mathematical Methods," Seismic Processing 2: Mathematical Methods, 1996, pp. 1339-1342.

Rickett, James E., et al., "Offset and angle-domain common image-point gathers for shot-profile migration," Geophysics, vol. 67, No. 3, May-Jun. 2002, pp. 883-889.

Guitton, Antoine, "Shot-profile migration of multiple reflections," SEG Int'l Exposition and 72nd Annual Meeting, Salt Lake City, Utah, Oct. 6-11, 2002, pp. 1-4.

Carlson, David, et al., "Increased resolution and penetration from a towed dual-sensor streamer," first break vol. 25, Dec. 2007, pp. 71-77.

Muijs, Remco, et al., "Prestack depth migration of primary and surface-related multiple reflections: Part I—Imaging," Geophysics, vol. 72, No. 2, Mar.-Apr. 2007, pp. S59-S69.

Artman, Brad, et al., "Image-space surface-related multiple prediction," Geophysics, vol. 72, No. 2, Mar.-Apr. 2007, pp. S113-S122.

Valenciano, A.A., et al., "Fourier Finite-difference Migration for 3D TTI Media," 7th EAGE Conference & Exhibition—Amsterdam, The Netherlands, Jun. 8-11, 2009.

Whitmore, N.D., "Deep Water Prestack Imaging with Primaries and Multiples," Twelfth International Congress of the Brazilian Geophysical Society, Aug. 15-18, 2011, pp. 1-5.

Whitmore, N.D., "Imaging of primaries and multiples using a dual-sensor towed streamer," SEG Denver 2010 Annual Meeting, 2010, pp. 3187-3192.

Whitmore, N.D., "Imaging of Primaries and Multiples with Image Space Surface Related Multiple Elimination," 73rd EAGE Conference & Exhibition incorporating SPE EUROPEC 2011, May 23-26, 2011.

Verschuur, D.J (Eric), et al., "Seismic migration of blended shot records with surface-related multiple scattering," Geophysics, vol. 76 No. 1, Jan.-Feb. 2011, pp. A7-A13.

Brittan, John, et al., "Improved imaging in complex geology using separated wavefields," first break vol. 30, Nov. 2012, pp. 83-88.

European Extended Search Report mailed on Jul. 20, 2015, in the prosecution of patent application No. 13191234.7, 9 pages.

* cited by examiner

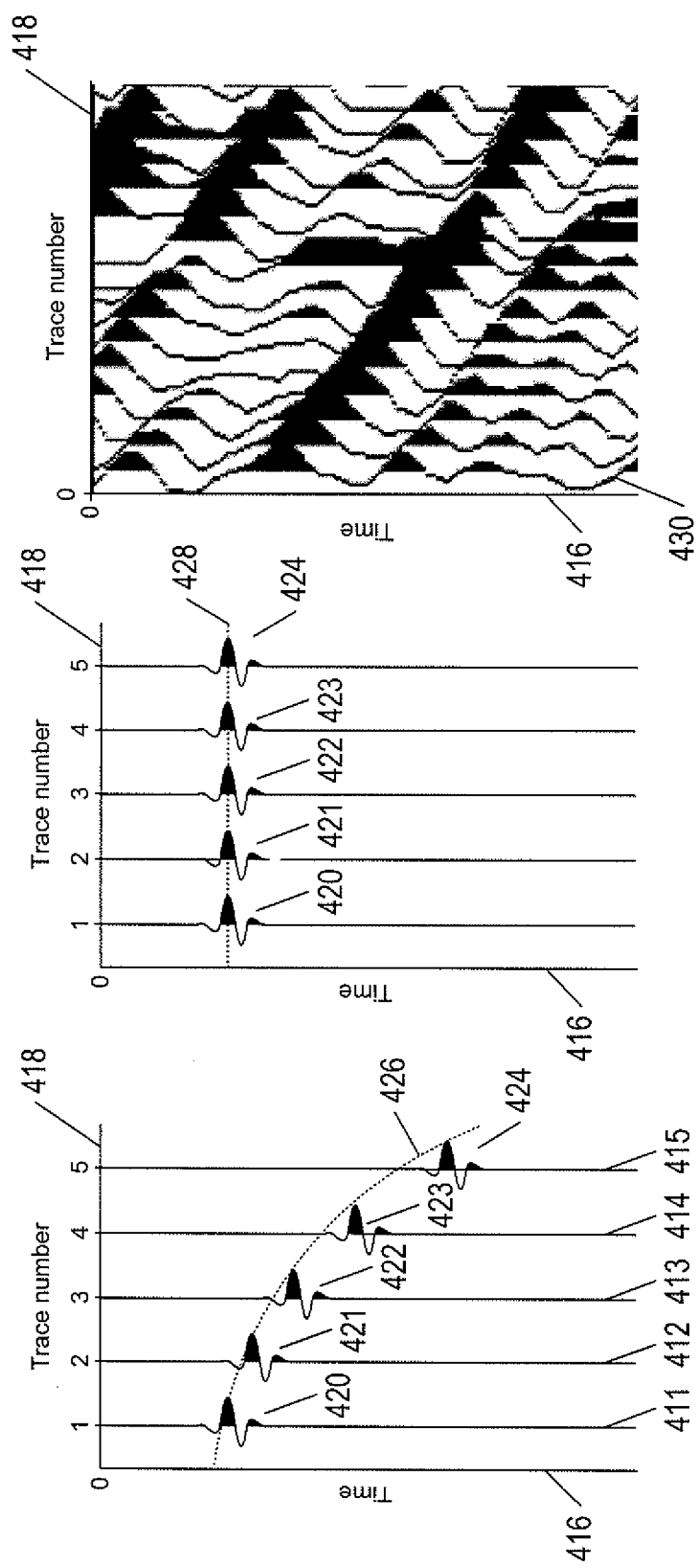

SYSTEMS AND METHODS FOR HIGH-RESOLUTION IMAGING USING SEPARATED WAVEFIELDS

CROSS-REFERENCE TO RELATED APPLICATION

This application claims the benefit of Provisional Application No. 61/721,327, filed Nov. 1, 2012.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and reservoir monitoring. For a typical marine seismic survey, an exploration-seismology vessel tows a seismic source, and the same vessel, or another vessel, tows one or more streamers that form a seismic data acquisition surface below the surface of the water and above a subterranean formation to be surveyed for mineral deposits. The vessel contains seismic acquisition equipment, such as navigation control, seismic source control, seismic receiver control, and recording equipment. The seismic source control causes the seismic source, which is typically an array of source elements, such as air guns or marine vibrators, to produce acoustic impulses at selected times. Each acoustic impulse is a sound wave that travels down through the water and into the subterranean formation. At each interface between different types of rock, a portion of the sound wave is transmitted and another portion is reflected back into the body of water to propagate toward the surface. The streamers towed behind the vessel are elongated cable-like structures. Each streamer may include a number of seismic receivers or multi-component sensors that detect pressure and/or particle motion wavefields associated with the sound waves reflected back into the water from the subterranean formation.

Sound waves that propagate down into the subsurface and undergo a single reflection from an interface before being detected by seismic receivers are called "primary reflections," and sound waves that are reflected within the subterranean formation and/or reflected from the free surface before being detected by seismic receivers are called "multiple reflections." In the past, conventional imaging techniques relied almost exclusively on the primary reflections. As a result, significant computational effort was dedicated to attenuating the multiple reflections. In recent years, however, the multiple reflections have been recognized as providing additional, valuable information about the subterranean formation. In particular, multiple reflections that include at least one reflection from the free surface, called "free surface multiples," are typically the strongest and most significant of the multiple reflections to use in imaging a subterranean formation. Geophysicists, petroleum engineers, and others working in the petroleum industry continue to seek systems and methods that improve the quality of subterranean images.

DESCRIPTION OF THE DRAWINGS

FIGS. 4B-4D shows plots of gathers.

DETAILED DESCRIPTION

This disclosure presents computational systems and methods for obtaining high-resolution, three-dimensional seismic images of a region of a subterranean formation using separated up-going and down-going wavefields that include primary and multiple reflections obtained by processing dual-sensor towed streamer seismic data. The inclusion of multiple reflections reduces acquisition footprints in migration of the seismic data. The computational systems and methods described below may produce higher resolution images of a subterranean formation than standard seismic imaging methods. The methods and systems may employ a digitally encoded wavefields, constructed from a discrete sampling of a two-dimensional slice of a three-dimensional wavefield, and stored in one or more tangible, physical data-storage devices. The computational systems and methods generate high-resolution seismic images of a region of a subterranean formation from the stored wavefields in order to enable quantitative seismic interpretation and improved reservoir monitoring. Such improvements in seismic interpretation and reservoir monitoring can result in significant costs savings during hydrocarbon exploration, production, and extraction operations.

Figure 1A:
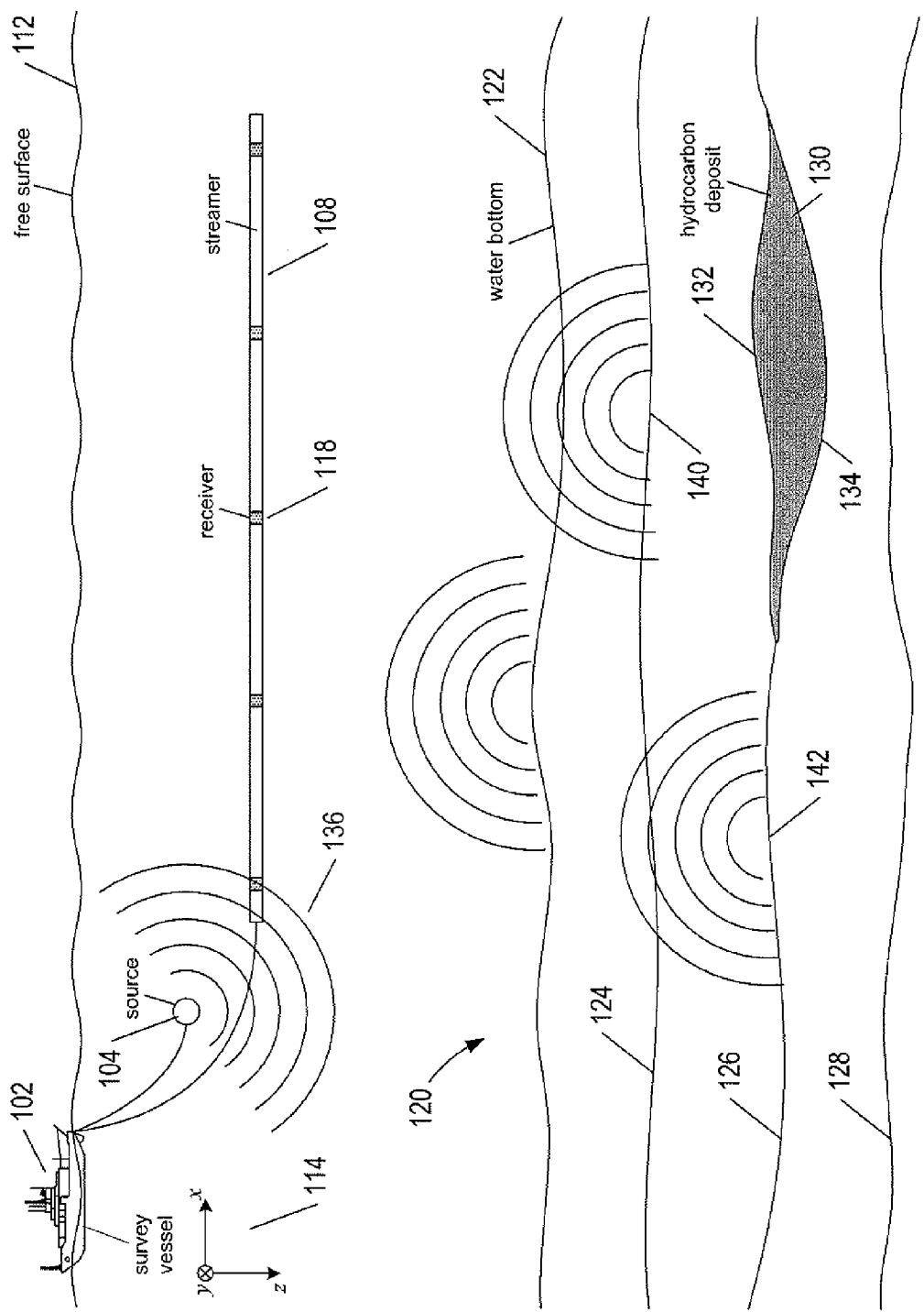
FIGS. 1A-1B show side-elevation and top views of an example geophysical seismic data acquisition system.
Figure 1B:
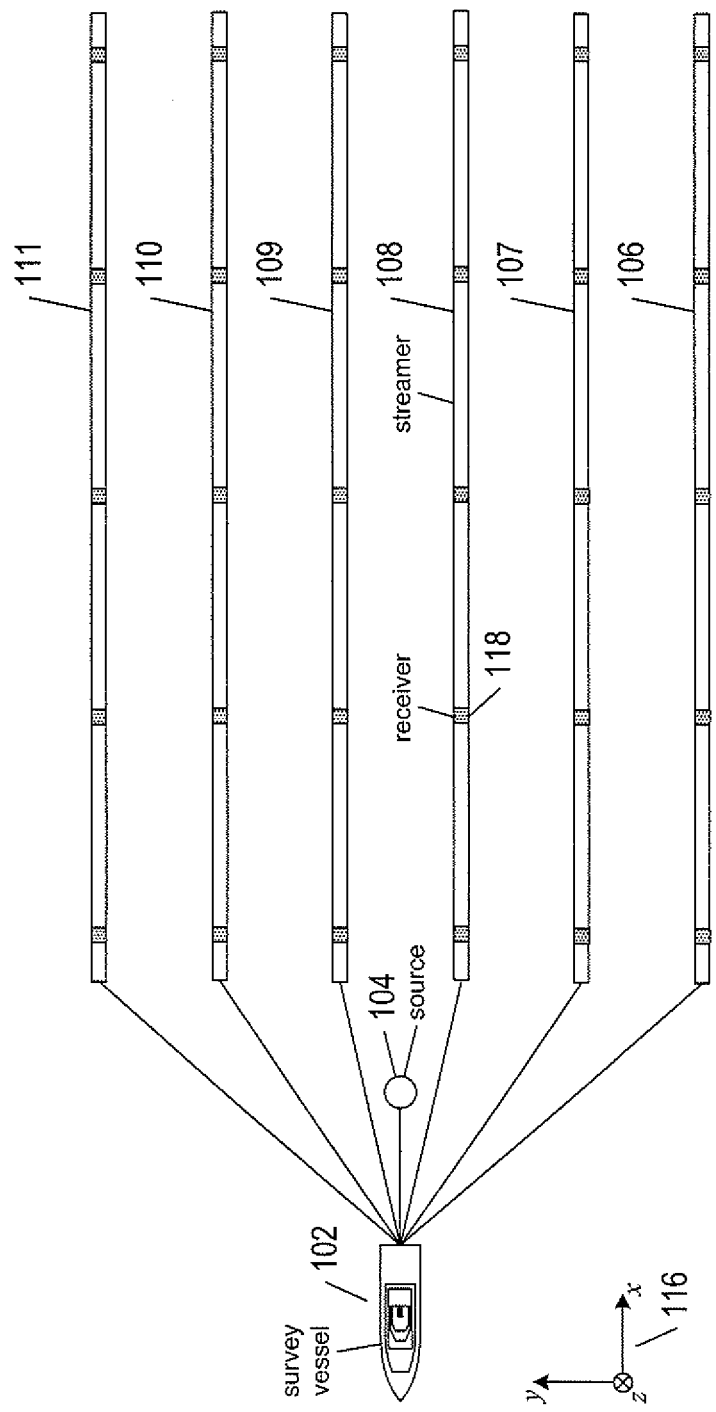

FIGS. 1A-1B show side-elevation and top views, respectively, of an example geophysical seismic data acquisition system composed of an exploration survey vessel 102 towing a source 104 and six separate streamers 106-111 beneath a free surface 112 of a body of water. The body of water can be an ocean, a sea, a lake, or a river, or any portion thereof. In this example, each streamer is attached at one end to the survey vessel 102 via a streamer-data-transmission cable. The streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B as straight and substantially parallel to the fee surface 112, in practice, the towed streamers may undulate as a result of dynamic conditions of the body of water in which the streamers are submerged. It should be noted that a data acquisition surface is not limited to having a planar horizontal orientation with respect to the free surface 112. The streamers may be towed at depths that orient the data acquisition surface at one or more angles with respect to the free surface 112 or so that one or more of the streamers are towed at different depths. It should also be noted that a data acquisition surface is not limited to six streamers as shown in FIG. 1B. In practice, the number of streamers used to form a data acquisition surface can range from as few as one streamer to as many as 20 or more streamers.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect the receivers, represented by shaded rectangles 118, spaced-apart along the length of each streamer to seismic acquisition equipment and data-storages devices located on board the survey vessel 102.

Streamer depth below the free surface 112 can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites that control and maintain the depth and position of the streamers as the streamers are towed through the body of water. The depth measuring devices are typically placed at intervals (e.g., about 300 meter intervals in some embodiments) along each streamer. Note that in other embodiments buoys may be attached to the streamers and used to maintain the orientation and depth of the streamers below the free surface 112.

FIG. 1A shows a cross-sectional view of the survey vessel 102 towing the source 104 and streamers above a subterranean formation 120. Curve 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a fluid-rich subterranean deposit, the depth and positional coordinates of which may be determined by analysis of seismic data collected during a marine seismic survey. As the survey vessel 102 moves over the subterranean formation 120 the source 104 produces an acoustic impulse called a "shot" at spatial and temporal intervals. In other embodiments, the source 104 may be towed by a separate survey vessel or a number of sources may be towed by a number of different vessels. Source 104 may be an air gun, marine vibrator, or an array of air guns and/or marine vibrators. FIG. 1A illustrates an acoustic impulse expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 144 is called the "primary wavefield," which eventually reaches the surface 122 of the subterranean formation 120, at which point the primary wavefield is partially reflected from the surface 122 and partially refracted downward into the subterranean formation 120, becoming elastic waves within the subterranean formation 120. In other words, in the body of water, the acoustic impulse is composed of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves are partially reflected and partially refracted. As a result, each point of the surface 122 and each point of the interfaces within the underlying subterranean formation 120 becomes a potential secondary point source from which acoustic and elastic wave energy, respectively, may emanate upward toward the receivers 118 in response to the acoustic impulse generated by the source 104 and downward-propagating elastic waves generated from the pressure impulse. As shown in FIG. 1A, secondary waves of significant amplitude may be generally emitted from points on or close to the surface 122, such as point 138, and from points on or very close to interfaces in the subterranean formation 120, such as points 140 and 142.

The secondary waves may be generally emitted at different times within a range of times following the initial acoustic impulse. A point on the surface 122, such as the point 138, may receive a pressure disturbance corresponding to the initial acoustic impulse more quickly than a point within the subterranean formation 120, such as points 140 and 142. Similarly, a point on the surface 122 directly beneath the source 104 may receive the acoustic impulse sooner than a more distant-lying point on the surface 122. Thus, the times at which secondary and higher-order waves are emitted from various points within the subterranean formation 120 may be related to the distance, in three-dimensional space, of the points from the source 104.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the primary wave travels. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Secondary wavefronts that travel directly from the surface 122 or a subterranean interface to the receivers without experiencing other reflections from the free surface or other interfaces are called "primary reflections" or simply "primaries." On the other hand, multiple reflections are secondary wavefronts that experience more than one subterranean reflection and/or reflections from the free surface before being detected by seismic receivers are called "multiple reflections" or simply "multiples." For example, multiple reflections include reflections from an interface that are subsequently reflected from the free surface back down into the subterranean formation where the acoustic energy to be reflected and subsequently detected by the receivers.

Figure 2:
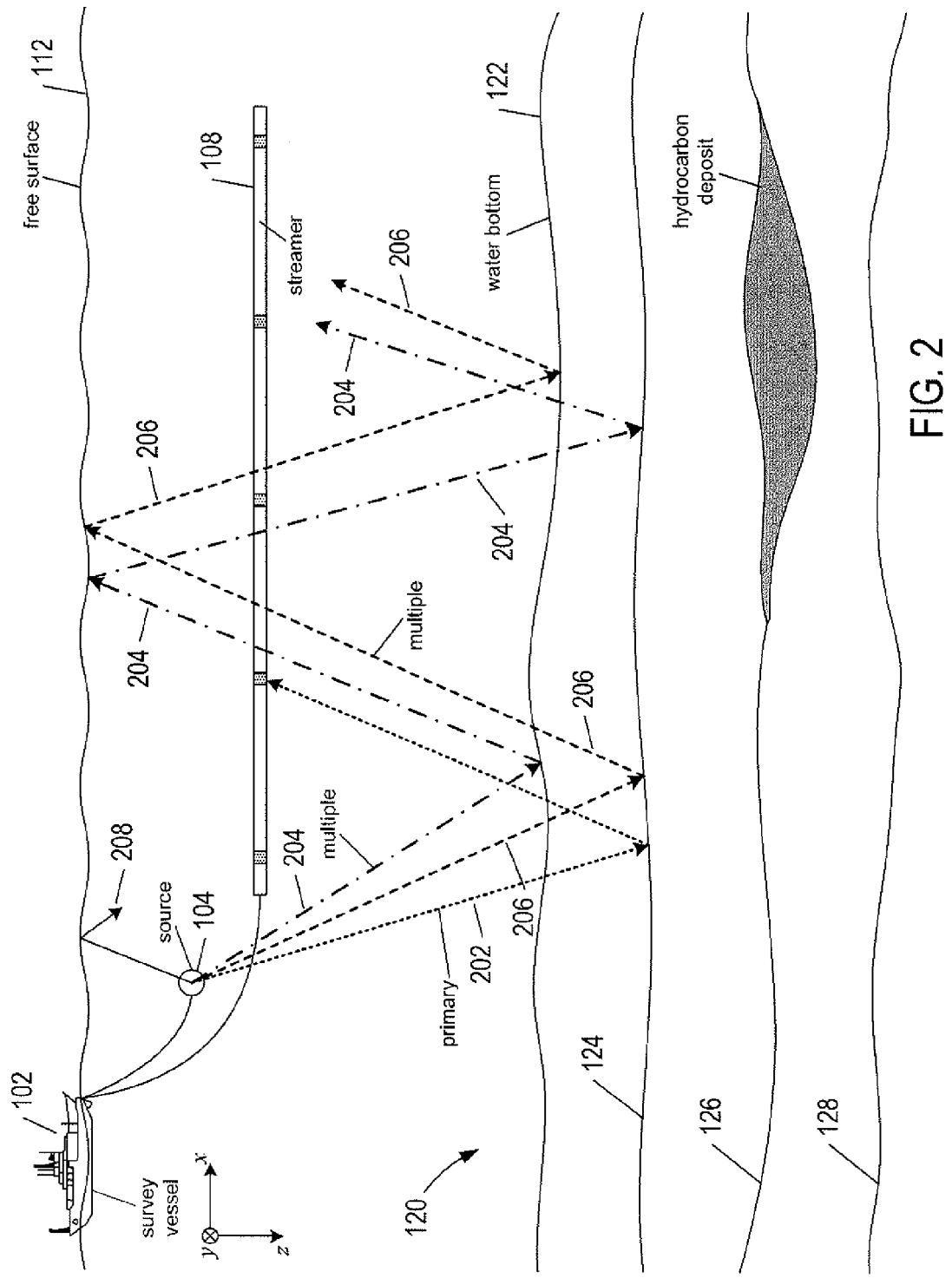
FIG. 2 shows examples of primary and multiple reflections.

FIG. 2 shows examples of primary and multiple reflections. Dotted directional arrows 202 represent a primary reflection in which sound waves associated with a sound impulse generated by the source 104 enter the subterranean formation 120 and undergo a reflection from the interface 124 back into the body of water to be measured by receivers of the acquisition surface. On the other hand, dot-dash line directional arrows 204 represent one type of multiple reflection in which a sound wave generated by the source 104 undergoes multiple reflections consisting of a reflections from the surface 122 followed by a reflection from the free surface 112, and a subsequent reflection from the interface 124 before being measured by the receivers of the acquisition surface. Dashed-line directional arrows 206 represent a second type of multiple reflection in which a sound wave generated by the source 104 undergoes multiple reflections consisting of a reflection from the interface 124, followed by a reflection from the free surface 112, and a reflection from the surface 122 before being measured by the receivers the acquisition surface. There are any number of other different kinds of multiple reflections including sound waves produced by the source 104 that are first reflected from the free surface 112, as represented by directional arrow 208, before the waves travel into the subterranean formation to produce scattered wavefields directed back toward the free surface. Multiple reflections also include more than one reflection between interfaces within the subterranean formation before being measured by receivers of the acquisition surface.

Figure 3:
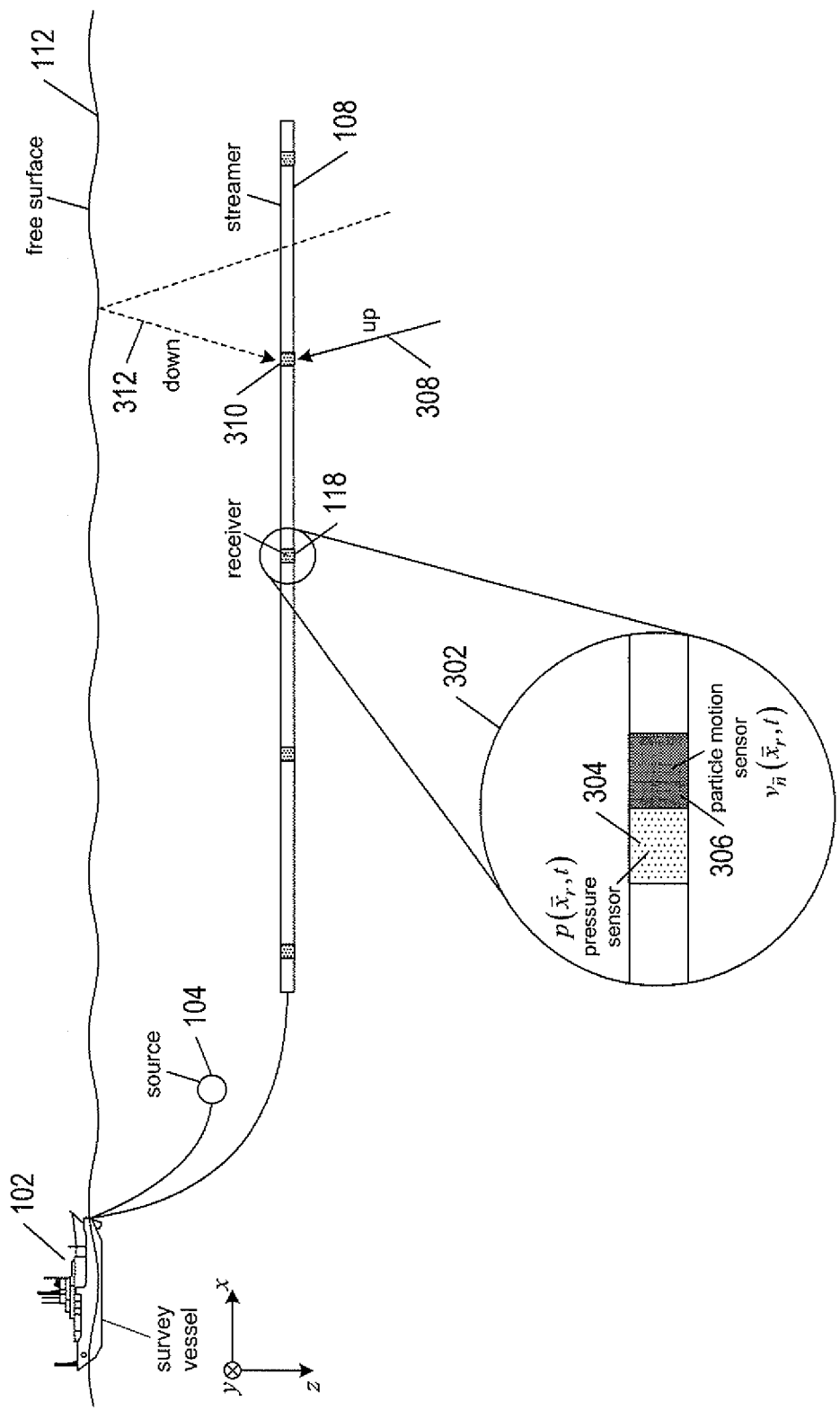
FIG. 3 shows a side-elevation view of marine seismic data acquisition system with a magnified view of a receiver.

Each receiver 118 may be a dual sensor including a particle motion sensor that detects particle motion, velocities, or accelerations over time and a pressure sensor that detects variations in water pressure over time. FIG. 3 shows a side-elevation view of the marine seismic data acquisition system with a magnified view 302 of receiver 118. The magnified view 302 reveals that the receiver 118 may be a dual sensor composed of a pressure sensor 304 and a particle motion sensor 306. The pressure sensor may be a hydrophone. Each pressure sensor measures changes in hydrostatic pressure over time and produces pressure data denoted by $p(\vec{x}, t)$, where $\vec{x}$ represents the Cartesian coordinates (x, y, z) of the receiver, and t represents time. The motion sensors may be responsive to water motion. In general, particle motion sensors detect particle motion in a direction normal to the orientation of the particle motion sensor and may be responsive to such directional displacement of the particles, velocity of the particles, or acceleration of the particles. The motion sensor data produced by the particle motion sensors may be converted to particle motion velocity data. For example, when motion sensors that are responsive to position are used, the motion sensor data may be differentiated to convert the data to particle motion velocity data. Likewise, when motion sensors that are responsive to acceleration (i.e., accelerometers) are used, the particle acceleration data may be integrated to convert the data to particle motion velocity data. The resulting data produced by the motion sensors may be direction dependent particle velocity data denoted by $v_{\vec{n}}(\vec{x}, t)$, where unit normal vector $\vec{n}$ points in the direction particle motion is measured. The particle motion sensors are typically oriented so that the particle motion is measured in the vertical direction (i.e., $\vec{n}=(0, 0, z)$) in which case $v_z(\vec{x}, t)$ is called the vertical velocity wavefield. The pressure and particle velocity data comprise the seismic data. The streamers 106-111 and the survey vessel 102 may include sensing electronics and data-processing facilities that allow measurements from each receiver to be correlated with absolute positions on the free surface 112 and absolute three-dimensional positions with respect to an arbitrary three-dimensional coordinate system. The pressure data and particle motion data may be sent along the streamers and data transmission cables to the vessel 102, where the data may be stored electronically or magnetically on data-storage devices located onboard the vessel 102. The pressure data and particle motion data represent pressure and velocity wavefields and, therefore, may also be referred to as the pressure wavefield and velocity wavefield, respectively.

In FIG. 3, directional arrow 308 represents the direction of an up-going wavefield at the location of receiver 310 and dashed arrow 312 represents a down-going wavefield produced by an up-going wavefield reflection from the free surface 112 before reaching the receiver 310. In other words, the pressure wavefield $p(\vec{x}, t)$ is composed of an up-going pressure wavefield component and a down-going pressure wavefield component, and the velocity wavefield $v_{\vec{n}}(\vec{x}, t)$ is composed of an up-going velocity wavefield component and a down-going velocity wavefield component. The down-going wavefield contaminates pressure and particle motion velocity data and creates notches in the spectral domain. Filtering may be done to remove the down-going wavefields from the pressure and particle motion velocity data, leaving the up-going wavefields which are typically used to generate images of the subterranean formation.

Each pressure sensor and particle motion sensor generates seismic data that may be stored in data-storage devices located onboard the survey vessel. The seismic data is measure by each pressure sensor or motion sensor is a time series that consist of a number of consecutively measured values called amplitudes separated in time by a sample rate. The time series measured by a pressure or motion sensor is called a "trace," which may consist of thousands of samples with a sample rate of about 1 to 5 ms. A trace is a recording of a subterranean formation response to acoustic energy that passes from the source 104, through subterranean layers, and is ultimately recorded by a sensor as described above. A trace records variations in a time-dependent amplitude that represents acoustic energy in the portion of the secondary wavefield measured by the sensor. A secondary wavefield typically arrives first at the receivers located closest to the source 104. The distance from the source 104 to a receiver is called the source-receiver offset, or simply offset, which creates a delay in the arrival time of a secondary wavefield from a substantially horizontal interface within the subterranean formation. A larger offset generally results in a longer time delay.

Figure 4A:
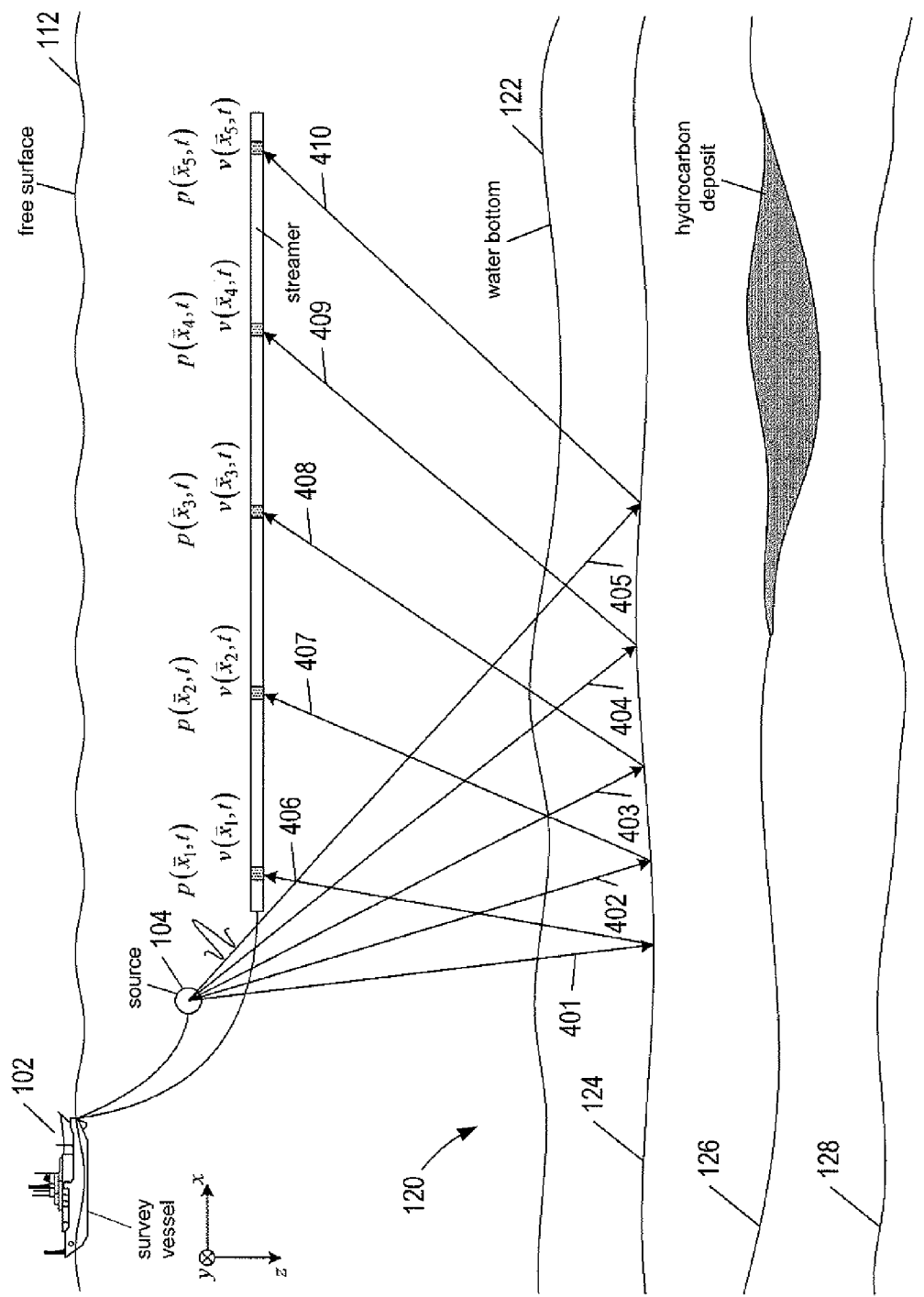
FIG. 4A shows ray paths that represent paths of acoustic energy that travels from a source to the interface.

FIG. 4A shows ray paths 401-405 that represent paths of an acoustic impulse 400 that travels from the source 104 to the interface 124. Rays 406-410 represent the paths of acoustic energy reflected from the interface 124 (i.e., secondary wavefields) to the receivers located along the streamer 108. Each pressure sensor measures the hydrostatic pressure $p(\vec{x}, t)$ and each motion sensor measures particle motion velocity $v_{\vec{n}}(\vec{x}, t)$ of the acoustic energy generated by source 104 and reflected from the interface 124 (i.e., the aforementioned up-going wavefield). The hydrostatic pressure data $p(\vec{x}, t)$ and particle motion velocity data $v_{\vec{n}}(\vec{x}, t)$ measured by each receiver may be time sampled and recorded as separate traces. A number of traces taken together form a gather, which represents, in this illustration, the measured up-going wavefield.

FIG. 4B shows a plot of a source-receiver gather of example traces 411-415 of the up-going wavefield recorded by the five receives located along the streamer 108 shown in FIG. 4A. Vertical axis 416 represents time and horizontal axis 418 represents trace numbers with trace "1" representing the seismic data generated by the receiver located closest to the source 104 and trace "5" representing the seismic data generated by the receiver located farthest from the source 104. The traces 411-415 can represent variation in the amplitude of either the pressure data $p(\vec{x}, t)$ or the velocity data $v_n(\vec{x}, t)$, recorded by corresponding sensors of the five receivers. The example traces include wavelets or pulses 420-424 that represent the up-going wavefield. Peaks, colored black, and troughs of each trace represent changes in the amplitude measured by the pressure sensors or motion sensors. The distances along the traces 411-415 from the trace number axis 418 to the wavelets 420-424 represents the travel time of the acoustic energy output from the source 104 to the interface 124 and ultimately to the receivers. The amplitude of the peak or trough of the wavelets 420-424 indicates the magnitude of acoustic energy recorded by the pressure sensor or motion sensor.

The arrival times versus source-receiver offset is longer with increased source-receiver offset and, in this example, has a hyperbolic shape 426. The traces from different source-receiver pairs may be corrected during seismic data processing to remove the effects of different source-receiver offsets in a process called "normal moveout" ("NMO"). FIG. 4C shows a gather of the traces 420-424 after NMO has been applied to align the pulses in time as represented by horizontal line 428. After NMO corrections, traces from different shot records with a common reflection point can be stacked to form a single trace during seismic data processing. Stacking may improve the signal-to-noise ratio, reduce noise, improve seismic data quality, and reduce the amount of data.

In practice, a typical trace does not represent a single reflection from a single interface, as represented in FIGS. 4B-4C. In practice, a trace represents the time-dependant amplitude of acoustic energy associated with numerous reflections of acoustic energy from within the subterranean formation. FIG. 4D shows a gather of 15 traces recorded over a period of time. Each trace, such as trace 430, varies in amplitude over time and represents acoustic energy reflected from a number of different interfaces within a subterranean formation as measured by a pressure sensor or a motion sensor. The gather shown in FIG. 4D can represent a pressure wavefield or a velocity wavefield and can be a source-receiver gather, a common-receiver gather, or a common-midpoint gather.

Figure 5:
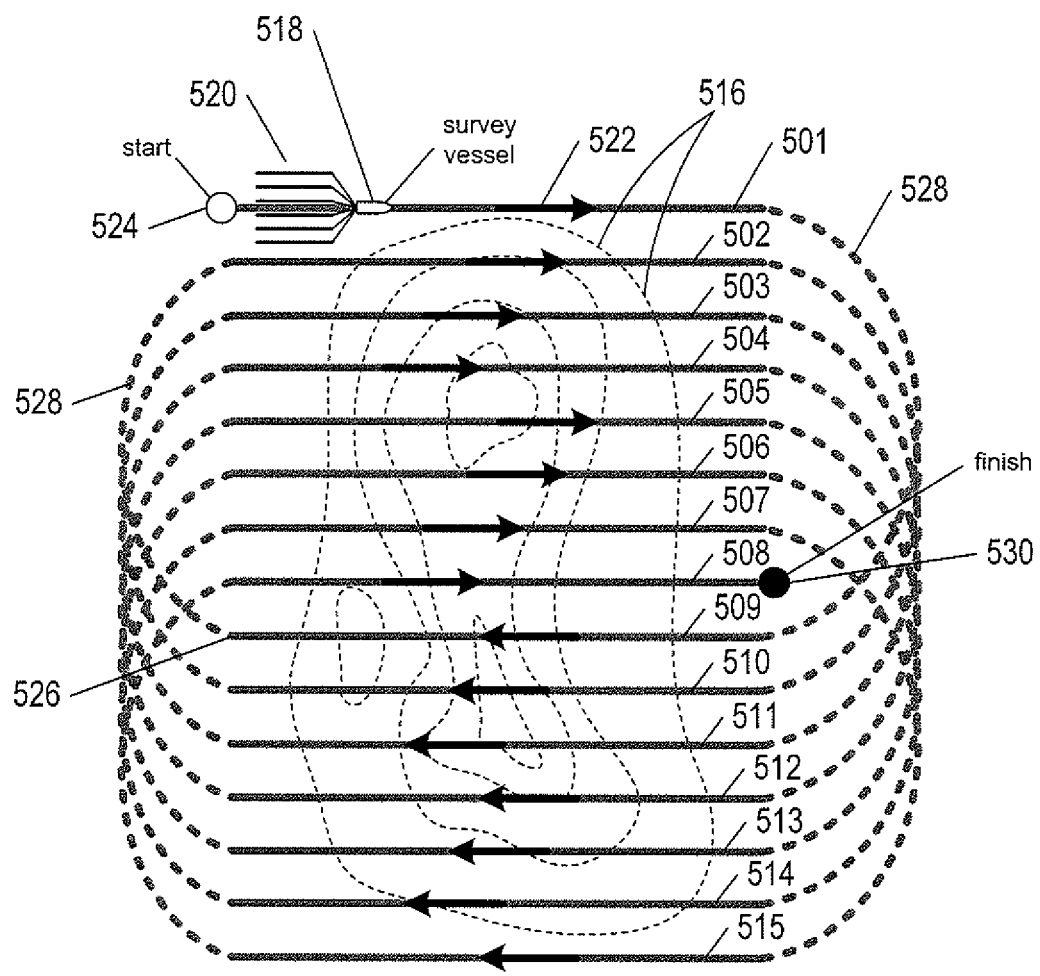
FIG. 5 shows sail lines of an example marine survey.

FIG. 5 shows a top view of sail lines 501-515 of a marine survey of a subterranean formation located beneath a body of water. Dashed line shapes 516 represent topographic contour lines of the formation. The subterranean formation 516 is surveyed to detect the presence and size of a petroleum reservoir located within the formation. A survey vessel 518 tows a set of streamers 520 and a source (not shown) along the parallel sail lines 501-515. Directional arrows, such as directional arrow 522, represent the direction the survey vessel 518 travels along the sail lines. The survey begins a start point 524. The survey vessel 518 activates the source and records the pressure and velocity wavefields measured by the receivers as the survey vessel 518 travels along each of the sail lines 501-515. For example, the source may be activated at substantially regular time and spatial intervals along each sail line. When the survey vessel reaches the end of a track, the survey vessel 518 stops activating the source and measuring and recording the wavefield and follows the path represented by an arc to a different track and begins activating the source and measuring and recording the wavefield. For example, at the end 526 of the sail line 509, the survey vessel 518 stops activating the source and measuring and recording the wavefield, follows the path 528 to the sail line 502 and the survey vessel 528 activates the source and measures and records the wavefields along the sail line 502. The survey vessel 518 continues this pattern of activating the source and measuring and recording the wavefields along each of the sail lines 501-515 until the survey vessel 518 reaches a finish point 530 located at the end of the sail line 508.

The straight sail lines 501-515 shown in FIG. 5 represent an example of ideal straight paths travelled by a survey vessel. In practice, however, a typical survey vessel is subject to shifting currents, winds, and tides and may only be able to travel approximately parallel straight sail lines. In addition, the streamers towed behind a survey vessel may not be towed directly behind the survey vessel because the streamers are subject to changing conditions, such as weather and currents. As a result, the streamers may deviate laterally from the track in a process called "feathering."

Sail lines are not restricted to straight sail lines described above with reference to FIG. 5. Sail lines can be curved, circular or any other suitable non-linear path. For example, in coil shooting surveys, a survey vessel travels in a series of overlapping, continuously linked circular, or coiled, sail lines. The circular shooting geometry acquires a full range of offset data across every azimuth to sample the subsurface geology in all directions.

Typical methods for imaging a subterranean formation may use only the seismic data associated with the primary reflections. However, the quality of the subterranean images produced from these methods depends in large part on the useable incident angles that can be processed. For example, in typical marine acquisition, the nearest seismic receiver may be about 100-200 meters from the source and the nearest receiver on the farthest steamer may be anywhere from about 500 to several thousand meters from the source. This large offset often limits the useable data for high-resolution imaging with primaries, because the data is muted (often referred to as "zeroed") or because the image from large incident angles is very poorly resolved. This problem is particularly challenging when imaging a shallow subsurface. A second limitation of imaging with primaries alone results from large sail line spacing, where the sail lines may be several hundred meters apart. This large spacing between sail lines may cause an acquisition footprint (i.e., decreased illumination) between the sail line centers, which may be partly mitigated by using an expanded number of streamers. However the large sail-line spacing once again results in poor resolution due to large incident angles, particularly for receivers located on the streamers located farthest from the source.

The image from separated wavefields may be from two sets of data generated from dual-sensor acquisition and processing. The seismic data may be composed of a processed down-going wavefield that propagates from the free surface to the reflector and the reflected data is an up-going wavefield that is subsequently detected by the receivers. The imaging systems and methods described below extrapolate down-going and up-going wavefield surface data into the model subsurface to produce a high-resolution image by computing the locations where these wavefields are in phase.

The image from the separated wavefields may produce a higher spatial resolution image of the seismic data than an image produced exclusively from primaries. This is due to the fact that the down-going and up-going wavefields may act as effective source and receiver arrays, using the free surface related multiples as the signals to be imaged. This may provide more spatial coverage and contain smaller incident angles during imaging. Increasing the number of cables and decreasing the spacing of the cables may improve spatial coverage and improves resolution.

Figure 6:
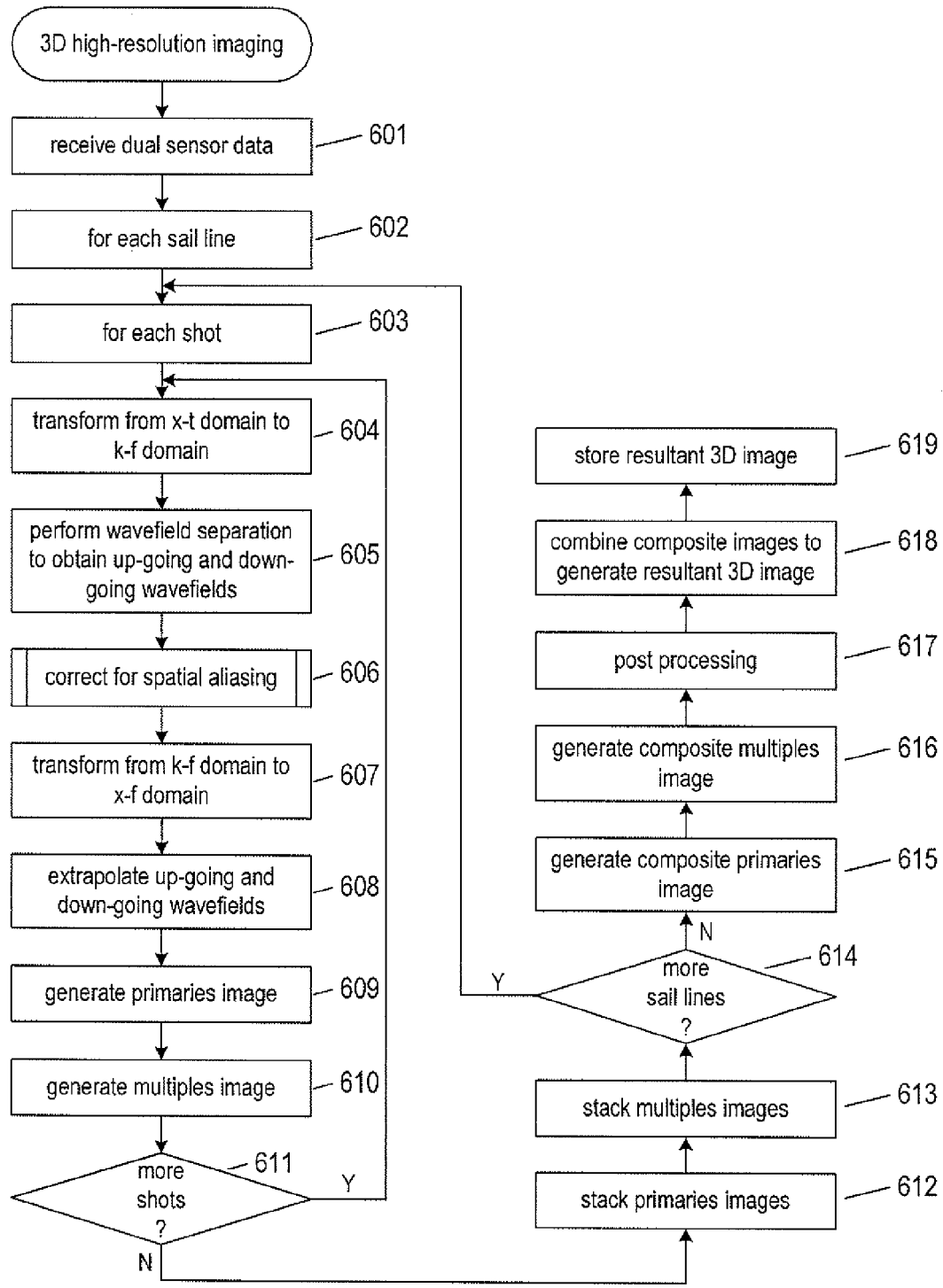
FIG. 6 provides a control-flow diagram that illustrate one implementation of a method for generating high-resolution three-dimensional seismic images.
Figure 7:
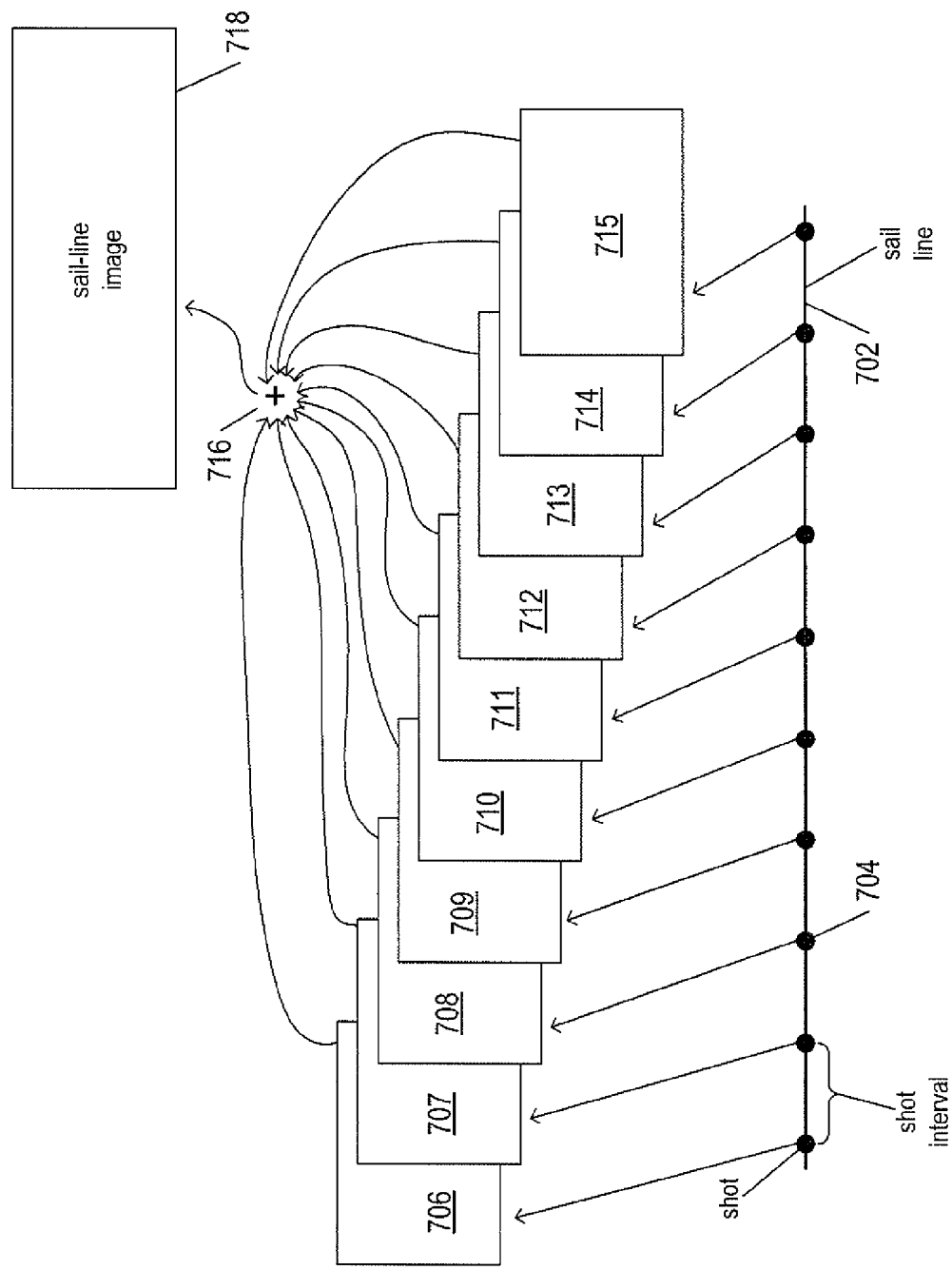
FIG. 7 shows an example of generating a sail-line image along a sail line of a survey.

FIGS. 6-7 show control-flow diagrams of methods for obtaining high-resolution, three-dimensional seismic images. The control-flow illustrations provided in FIGS. 6-7 encompasses a number of particular different implementations. For the sake of clarity and brevity, various programming and implementation details are omitted, including the exact variables, control structures, and data structures employed. These programming and implementation details generally vary depending on the hardware platform, operating system, and programming-language choice, among other things. They may be associated with different performance and data-storage characteristics and thus represent different intentional balancing of many different trade-offs considered for different specific applications. The methods described below may be performed in real time onboard a survey vessel while the survey vessel is conducting a survey.

In block 601 of FIG. 6, pressure wavefields $p(\vec{x}, t)$ and vertical velocity wavefields $v_z(\vec{x}, t)$ are measured at receivers located along a number of streamers, as described above with reference to FIG. 3, and stored onboard the survey vessel in seismic recording equipment, such as one or more data-storage devices. As used herein, data "storage" should be understood to mean retention of data in a fixed medium, rather than transmission of data via transitory waves or signals. The pressure wavefields $p(\vec{x}, t)$ and vertical velocity wavefields $v_z(\vec{x}, t)$ include both primary and multiple reflections, as described above with reference to FIG. 2, that are recorded in time intervals between activation of the source.

In an outer for-loop comprising blocks 602-614, the routine executes the computational operations represented by blocks 603-614 for seismic data collected along each sail line. In an inner for-loop comprising blocks 603-611, the routine executes the computational operations represented by blocks 604-610 for seismic data collected after each activation of the source (i.e., shot). In block 604, pressure wavefields $p(\vec{x}, t)$ and vertical velocity wavefields $v_z(\vec{x}, t)$ measured at receivers during a shot interval are transformed from the space-time domain, x-t, to a wavenumber-frequency domain, k-f using a transformation, such as the fast Fourier transform ("FFT") for computational speed and efficiency, to obtain:

$$p(\vec{x},t) \overset{FFT}{\rightarrow} P(k_x,k_y,z,\omega)$$

$$v_z(\vec{x},t) \overset{FFT}{\rightarrow} V_z(k_x,k_y,z,\omega) \quad (1)$$

where
$\omega=2\pi f$ is the angular frequency for frequency f,
$k_x$ is the in-line wavenumber; and
$k_y$ is the cross-line wavenumber.
Note that lowercase letters "p" and "v" represent pressure and velocity wavefields in the x-t domain and uppercase letters "P" and "V" represent pressure and velocity wavefields in the k-f domain.

In block 605, the pressure wavefield $P(k_x, k_y, z, \omega)$ and the vertical velocity wavefield $V_z(k_x, k_y, z, \omega)$ are used in wavefield separation to decompose the pressure wavefield, or vertical velocity wavefield, into up-going and down-going wavefields. In particular, the up-going pressure wavefield and the down-going pressure wavefield are given by:

$$P^{up} = \frac{1}{2}\left(P - \frac{\rho\omega}{k_z}V_z\right) \quad (2)$$

$$P^{down} = \frac{1}{2}\left(P + \frac{\rho\omega}{k_z}V_z\right)$$

where
$P^{up}$ denotes the up-going pressure wavefield;
$P^{down}$ denotes the down-going pressure wavefield;
$\rho$ is the density of the water in which the survey is conducted; and $$k_z = \sqrt{\left(\frac{\omega}{c}\right)^2 - k_y^2 - k_x^2}$$

with c the speed of the sound in water.
Alternatively, the up-going and down-going velocity wavefields are given by:

$$V^{up} = \frac{1}{2}\left(V_z - \frac{k_z}{\rho\omega}P\right) \quad (3)$$

$$V^{down} = \frac{1}{2}\left(V_z + \frac{k_z}{\rho\omega}P\right)$$

Up-going and down-going wavefields correspond to the up-going and down-going wavefields described with reference to FIG. 3. As described above with reference to FIG. 3, the up-going wavefield is represented by directional arrow 308 and the down-going wavefield is represented by directional arrow 312. The operations in block 605 is applied to the pressure and velocity wavefield measured after activating the source. In the following description, the notation D and U can be used to represent $P^{down}$ and $P^{up}$, respectively, or D and U can be used to represent $V_z^{down}$ and $V_z^{up}$, respectively.

In block 606, a routine "correct for spatial aliasing" is called to correct for spatial aliasing in the wavefields that may be due to spatial under sampling. In block 607, the up-going wavefields U and the down-going wavefields D are transformed from the k-f domain to the space-frequency domain, x-f. The transformation can be performed using an inverse FFT ("IFFT"):

$$U(k_x,k_y,z,\omega) \overset{FFT}{\rightarrow} U(\vec{x},\omega)$$

$$D(k_x,k_y,z,\omega) \overset{FFT}{\rightarrow} D(\vec{x},\omega) \quad (4)$$

In block 608, the up-going and down-going wavefields are extrapolated in the z-direction down into the subsurface. In particular, downward wavefield extrapolation transforms a wavefield, such as up-going wavefield $U(\vec{x}, \omega)$, at lateral location x, y and depth level z to the seismic wavefield U(x, y, z+Δz, ω) at depth level z+Δz by convolving $U(\vec{x}, \omega)$ with an extrapolation operator w(x, y, Δz, $k_\omega$(x, y)), where Δz is the extrapolation step size, and $k_\omega$(x, y)=ω/$v_z$(x, y). The spatial interval Δz is an extrapolation step size in the positive vertical z-coordinate direction described above with reference to FIG. 1A. The transformation in explicit depth extrapolation can be expressed in the space-frequency domain by a two-dimensional spatial convolution along the horizontal x- and y-directions, as given by:

$$U^{ex}(x, y, z + \Delta z, \omega) = w(x, y, \Delta z, k_\omega(x, y)) * U(\vec{x}, \omega) = \int\int w(x', y', \Delta z, k_\omega(x, y)) U(x - x', y - y', z, \omega) dx' dy' \quad (5)$$

where
the superscript "ex" denotes extrapolated wavefield;
"*" represents convolution; and
$\Delta z$ is positive for extrapolation of an up-going wavefield down into the subsurface.

The extrapolation is analogously applied to the down-going wavefield $D(x, y, z, \omega)$ to obtain an extrapolated down-going wavefield given by:

$$D^{ex}(x, y, z - \Delta z, \omega) = w(x, y, -\Delta z, k_\omega(x, y)) * D(\vec{x}, \omega) = \int\int w(x', y', -\Delta z, k_\omega(x, y)) D(x - x', y - y', z, \omega) dx' dy' \quad (6)$$

where
$\Delta z$ is negative for extrapolation of a down-going wavefield into the subsurface.

Extrapolation according to equations (5) and (6) may be implemented using a discrete version of the two-dimensional spatial convolution described in U.S. Pat. No. 7,035,737 owned by PGS America, Inc. filed Jun. 4, 2004, which is herein incorporated by reference.

In alternative implementations, the extrapolation can be performed in the k-f domain. In other words, prior to transforming the wavefields from the k-f domain to the x-f domain, as described in block 607 above, the wavefields may be extrapolated down into the subsurface (i.e., the positive z-direction) in the k-f domain as follows:

$$U^{ex}(k_x, k_y, z + \Delta z, \omega) = U(k_x, k_y, z, \omega) \exp(ik_z \Delta z)$$

$$D^{ex}(k_x, k_y, z - \Delta z, \omega) = D(k_x, k_y, z, \omega) \exp(-ik_z \Delta z) \quad (7)$$

A method for extrapolation in the k-f domain is described in U.S. Pat. No. 7,035,737. After the wavefields have been extrapolated, the extrapolated wavefields may be transformed to the x-f domain:

$$U^{ex}(k_x, k_y, z + \Delta z, \omega) \xrightarrow{FFT} U^{ex}(x, y, z + \Delta z, \omega)$$

$$D^{ex}(k_x, k_y, z - \Delta z, \omega) \xrightarrow{FFT} D^{ex}(x, y, z - \Delta z, \omega) \quad (8)$$

In block 609, a primaries image associated with a shot is generated using the primaries and a down-going source wavefield. The primaries image may be computed using a cross-correlation function given by:

$$I_{primaries}(\vec{x}, z) = \overline{S(\vec{x}, z, \omega)} U(\vec{x}, z, \omega) \quad (9)$$

where
$\tilde{x} = (x, y)$;
$\Delta\tilde{x}$ is the difference between adjacent horizontal wavefield positions;
$S(\tilde{x}, z, \omega)$ is the down-going source wavefield extrapolated from the surface;
and
the overbar represents the complex conjugate.

The down-going source wavefield $S(\tilde{x}, z, \omega)$ is an analytically calculated wavefield that represents the portion of the primary wavefield output from the source when the source is activated and propagates directly into the subterranean formation to produce a primary reflection represented by the up-going wavefield $U(\tilde{x}, z, \omega)$. Alternatively, the primaries image associated with a shot may be computed using a deconvolution function given by:

$$I_{primaries}(\tilde{x}, z) = \int \frac{\overline{S(\tilde{x}, z, \omega)} U(\tilde{x}, z, \omega)}{\frac{1}{M}\Sigma_j[\overline{S(\tilde{x} - j\Delta\tilde{x}, z, \omega)} S(\tilde{x} - j\Delta\tilde{x}, z, \omega)] + \alpha(\tilde{x}, z, \omega)} d\omega \quad (10)$$

where
$\alpha(\tilde{x}, z, \omega)$ is a stabilization parameter that may be included to avoid unstable division by small values of $S(\tilde{x}, z, \omega)$.

In block 610, a multiples image for the shot is computed using a deconvolution imaging condition given by:

$$I_{multiples}(\tilde{x}, z) = \int \frac{\overline{D^{ex}(\tilde{x}, z, \omega)} U^{ex}(\tilde{x}, z, \omega)}{\frac{1}{M}\Sigma_j[\overline{D^{ex}(\tilde{x} - j\Delta\tilde{x}, z, \omega)} D^{ex}(\tilde{x} - j\Delta\tilde{x}, z, \omega)] + \beta(\tilde{x}, z, \omega)} d\omega \quad (11)$$

where)
$\beta(\tilde{x}, z, \omega)$ is a stabilization parameter that may be included to avoid unstable division by small values of $D^{ex}(\tilde{x}, z, \omega)$.

In block 611, the computational operations represented by blocks 604-610 are repeated for seismic data measured in each shot interval of the sail line. When primaries and multiples images have been computed for each shot along the sail line, the method proceeds to block 612. In block 612, the primaries images generated for each shot along the sail line are stacked (i.e., summed) to generate a sail-line primary image associated with the sail line. In block 613, the multiples images generated for each shot along the sail line are stacked (i.e., summed) to generate a sail-line multiple images associated with the sail line.

FIG. 7 shows an example of a sail line 702 of a survey with shot positions, or source activation positions, represented by solid dots, such as dot 704. For each shot position 704 along the sail line 702, a primaries image and a multiples image is generated as described above with reference to blocks 604-610. Rectangles 706-715 represent primaries images calculate for each of the shots along the sail line 702. The primaries images may be stacked 716 by summing corresponding pixel coordinates to obtain a sail-line primaries image 718 for the sail line 702. The rectangles 706-715 may also represent multiples images calculated for each of the shots along the sail line 702. Similarly, the multiples images may be stacked 716 by summing corresponding pixel coordinates to obtain a sail-line multiples image 718 for the sail line 702.

In block 614 of FIG. 6, the computational operations represented by blocks 603-613 are repeated for the seismic data collected along each sail line of the survey. In block 615, the sail-line primaries images are summed at corresponding pixel coordinates to generate a composite primaries image. In block 616, the sail-line multiples images may be summed at corresponding pixel coordinates to generate a composite multiples image. In block 617, post image processing (or "post processing") may be applied separately to the composite primaries image and the composite multiples image. Post processing may include applying a depth-dependent normalization correction. Fold footprints often result from non-uniform receiver or streamer coverage during the survey, which can affect illumination of the image of the subterranean formation. For example, when adjacent sail lines have streamers that overlap in position, the images may have redundant data which increases the image illumination. On the other hand, when the streamers are too far apart on adjacent sail lines, the illumination may be reduced. To correct for increases and/or decreases in the illumination of the image a depth dependent normalization correction may be applied to the image, which corrects for these variations and normalizes the illumination. In block 618, the composite primaries image and the composite multiples image may be compared or combined to generate a 3D resultant image of the subterranean formation, as given by:

$$I_{resultant}(\tilde{x},z) = W_1(\tilde{x},z) * I_{primaries}^{composite}(\tilde{x},x) + W_2(\tilde{x},z) * I_{multiples}^{composite}(\tilde{x},z) \quad (12)$$

where $I_{primaries}^{composite}(\tilde{x}, z)$ is the composite primaries image; $I_{multiples}^{composite}(\tilde{x}, z)$ is the composite multiples image; and $W_1(\tilde{x}, z)$ and $W_2(\tilde{x}, z)$ are filters.

In one example implementation, $W_1(\tilde{x}, z)$ and $W_2(\tilde{x}, z)$ may be chosen such that the resultant image is the average of the primaries and multiples images. In an alternative implementation, $W_1(\tilde{x}, z)$ and $W_2(\tilde{x}, z)$ may be spatially variable. For example, $W_1(\tilde{x}, z)$ and $W_2(\tilde{x}, z)$ may be matching filters chosen to achieve an optimized stack of the composite primaries image and composite multiples images. In block 619, the results 3D image $I_{resultant}(\tilde{x}, z)$ is stored in a data-storage device.

Figure 8:
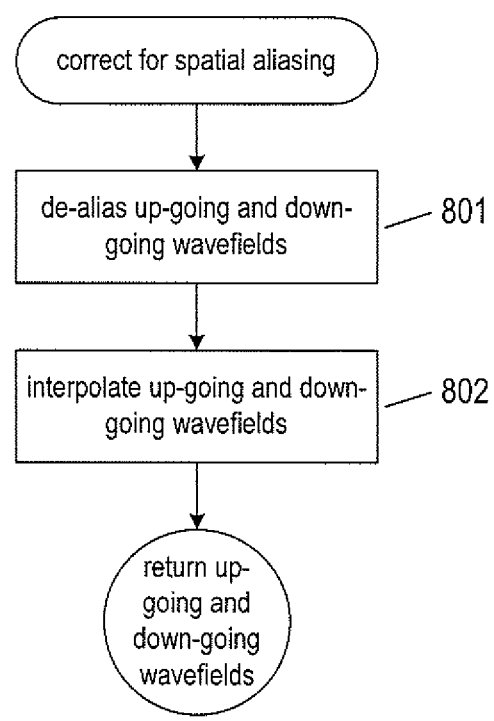
FIG. 8 provides a control-flow diagram of the routine "correct for spatial aliasing" called in block 606 of FIG. 6

FIG. 8 shows a flow-control diagram for the routine "correct spatial aliasing" called in block 606 of FIG. 6. In block 801, the up-going wavefield U(x, y, z, ω) and the down-going wavefield D(x, y, z, ω) are anti-aliased. In block 802, spatial aliasing in the xy-plane is corrected by interpolating traces based on the traces measured at the receivers. Interpolation is used to generate unrecorded traces that correspond to the up-going wavefield $U(x_c, y_c, z, \omega)$ and/or the down-going wavefield $D(x_c, y_c, z, \omega)$ at locations $(x_c, y_c)$ where the wavefield is undersampled. The interpolated traces are generated from recorded traces. Interpolation is applied to each multi-steamer array for each sail line to increase spatial sampling. The de-aliased and interpolated wavefields are returned.

The computational method described above with reference to FIG. 6 may be implemented in real time on board a survey vessel while a survey is being conducted. For example, the primaries and multiples images in blocks 609 and 610 may be generated between shots as the survey vessel travels a sail line. Sail line primaries and multiples images in blocks 612 and 613 may be generated when the survey vessel finishes traveling a sail line. The resultant 3D image may be generated immediate after completion of the survey.

Figure 9:
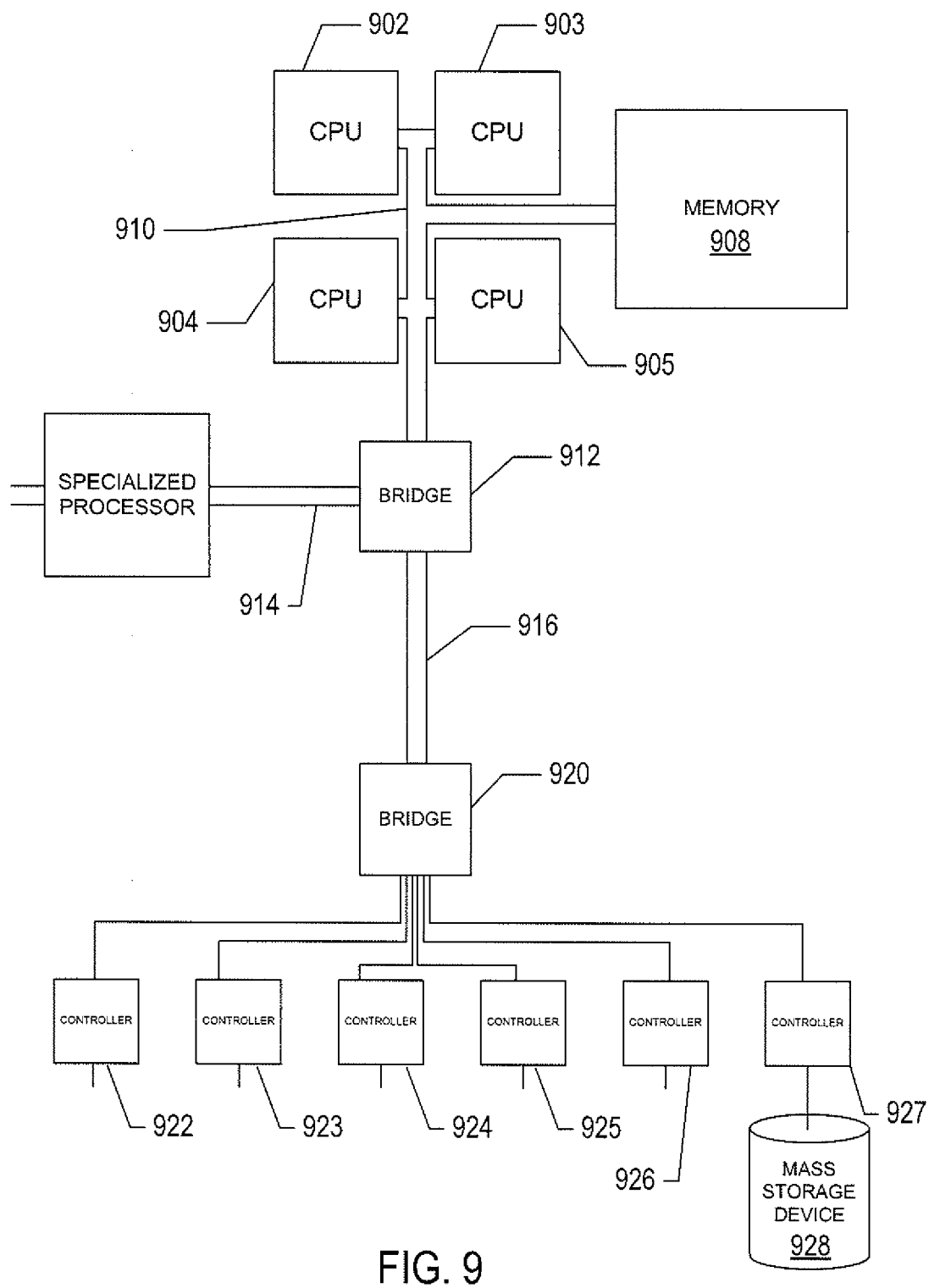
FIG. 9 shows an example of a generalized computer system that executes efficient methods for generating high-resolution three-dimensional images of a subterranean formation.

FIG. 9 shows an example of a generalized computer system that executes efficient methods for generating high-resolution 3D images of a subterranean formation and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 902-905, one or more electronic memories 908 interconnected with the CPUs by a CPU/memory-subsystem bus 910 or multiple busses, a first bridge 912 that interconnects the CPU/memory-subsystem bus 910 with additional busses 914 and 916, or other types of high-speed interconnection media, including multiple, high-speed serial interconnects. The busses or serial interconnections, in turn, connect the CPUs and memory with specialized processors, such as a graphics processor 918, and with one or more additional bridges 920, which are interconnected with high-speed serial links or with multiple controllers 922-927, such as controller 927, that provide access to various different types of computer-readable media, such as computer-readable medium 928, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 928 is a data-storage device, including electronic memory, optical or magnetic disk drive, USB drive, flash memory and other such data-storage device. The computer-readable medium 928 can be used to store machine-readable instructions that encode the computational methods described above and can be used to store encoded data, during store operations, and from which encoded data can be retrieved, during read operations, by computer systems, data-storage systems, and peripheral devices.

EXAMPLE

Figure 10A:
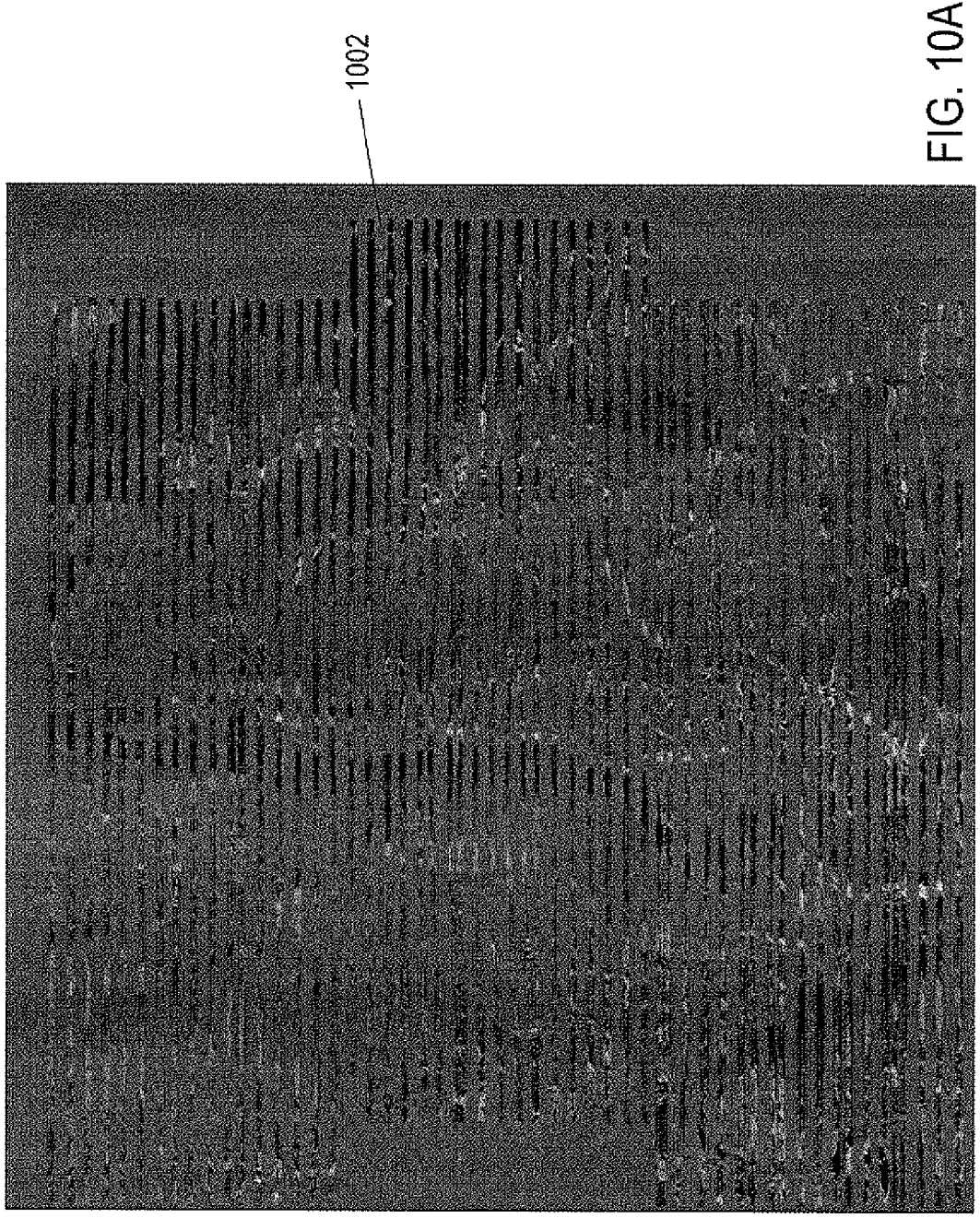
FIGS. 10A-10F show example seismic images.
Figure 10B:
Figure 10C:
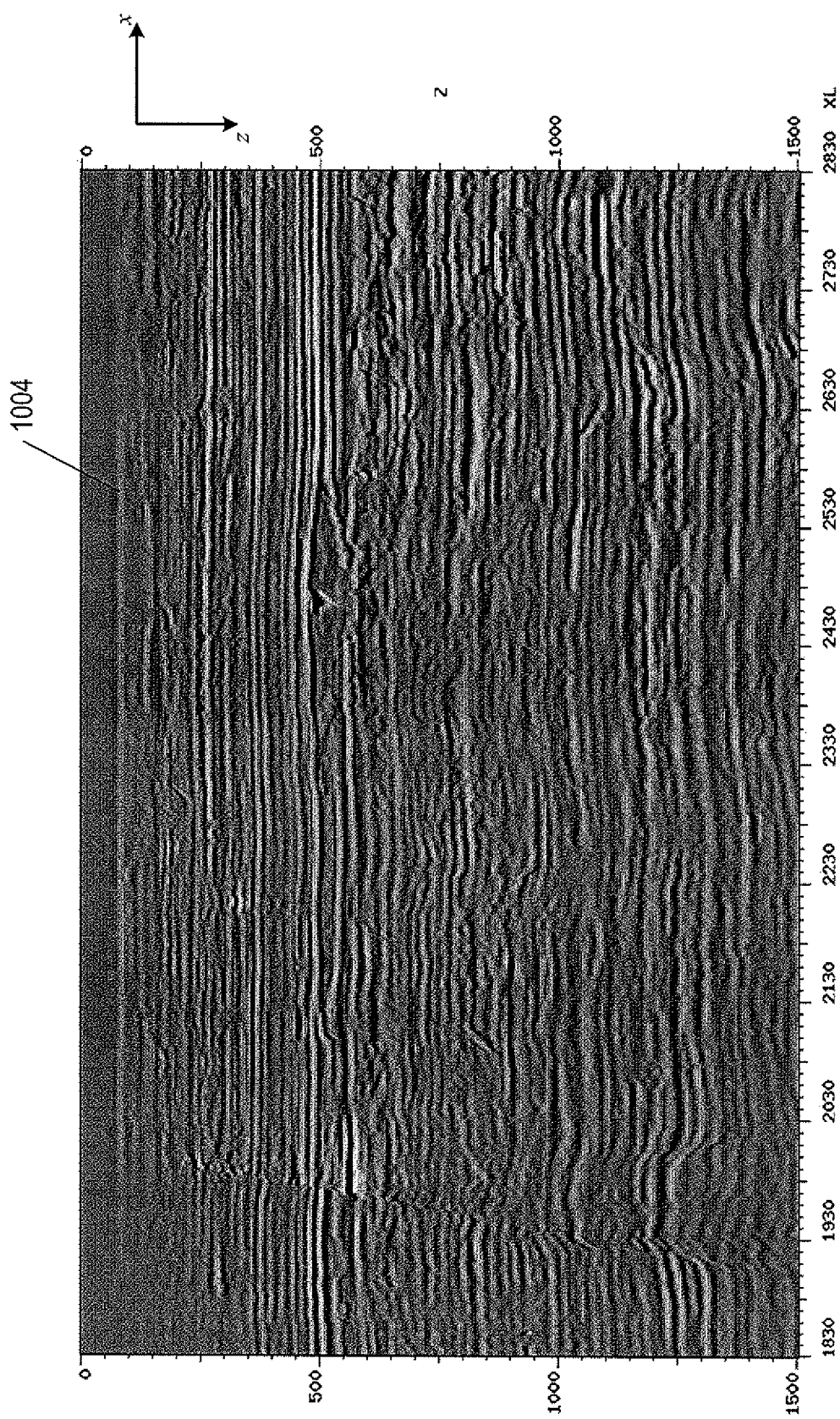
Figure 10D:
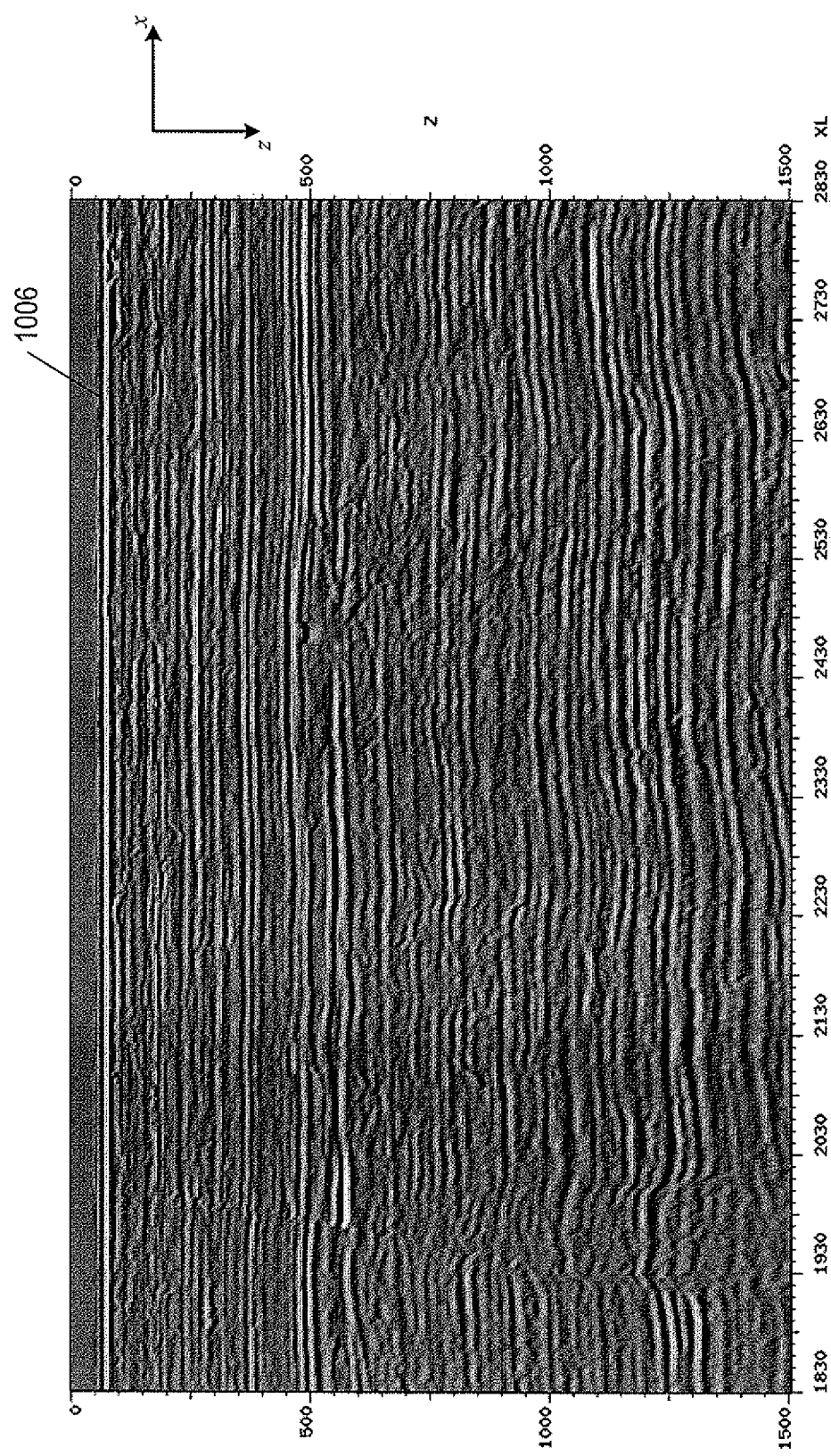
Figure 10E:
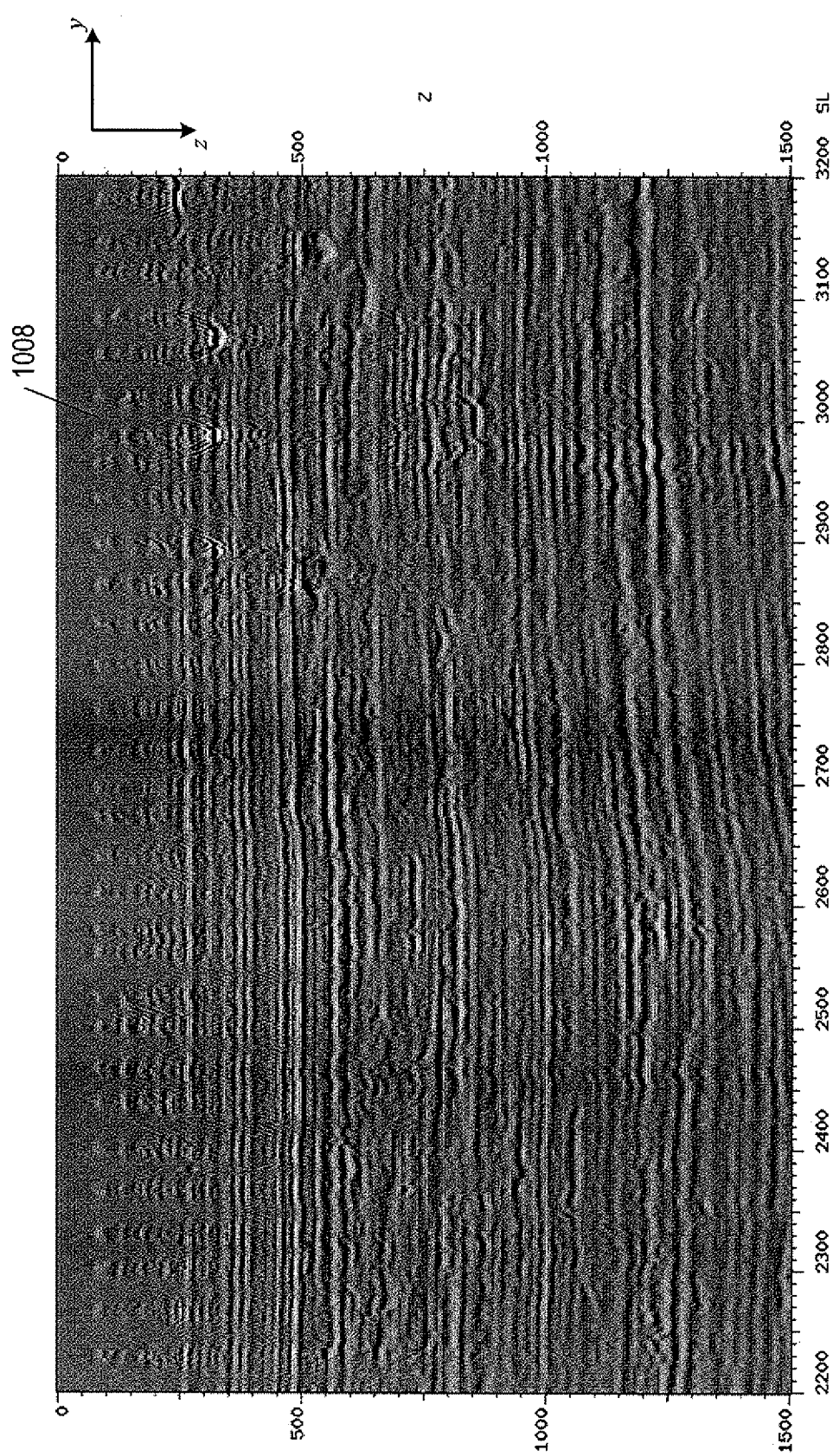
Figure 10F:
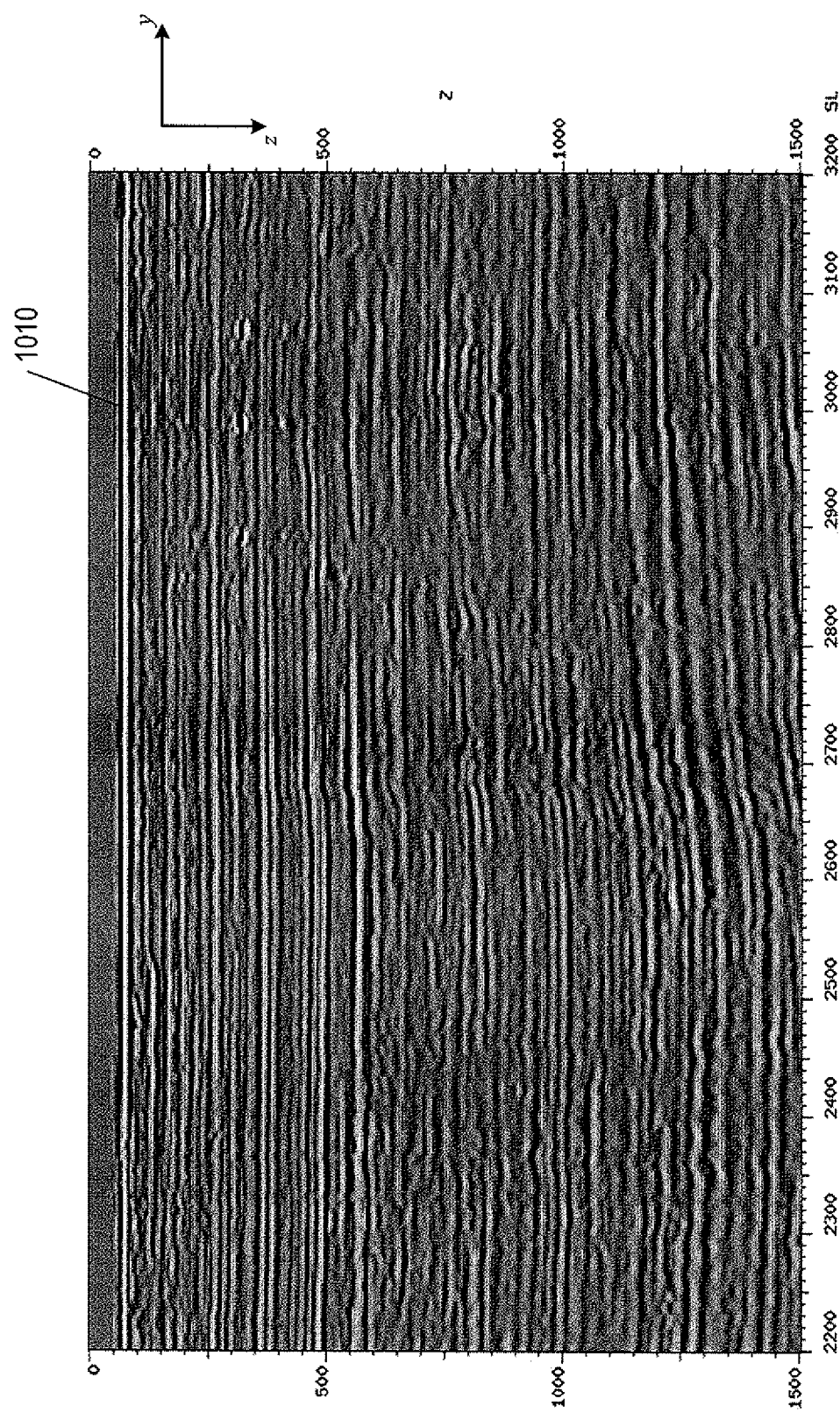

FIGS. 10A-10G illustrate seismic images that demonstrate the difference between conventional three-dimensional seismic imaging and the three-dimensional seismic image methods described above. FIG. 10A shows an xy-plane depth slice obtained using conventional imaging methods. Note the blank spaces that run in the x-direction, such blank space 1002. FIG. 10B shows the same xy-plane depth slice using the methods described above. Comparing the image in FIG. 10A with the image in FIG. 10B reveals that the methods described above fill in blank spaces image content giving a complete image shown in FIG. 10B. FIG. 10C shows a seismic image of an in-line slice along a streamer using convention imaging. Note the subterranean surface 1004 can hardly be identified in the image. On the other hand, FIG. 10D shows a seismic image of the same inline streamer using the method described above. In FIG. 10D the same subterranean surface 1006 is clearly identifiable. FIG. 10E shows a cross-line slice perpendicular to the streamers using conventional seismic imaging. Note the subterranean surface 1008 can hardly be identified. On the other hand, FIG. 10F shows a seismic image along the same cross-line slice using the methods described above. In FIG. 10F the same subterranean surface 1010 is clearly identifiable.

Although the above disclosure has been described in terms of particular embodiments, it is not intended that the disclosure be limited to these embodiments. Modifications within the spirit of the disclosure will be apparent to those skilled in the art. For example, any of a variety of different implementations of a high-resolution 3D imaging system can be obtained by varying any of many different design and development parameters, including programming language, underlying operating system, modular organization, control structures, data structures, and other such design and development parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for imaging a region of a subterranean formation during a marine survey of the subterranean formation comprising:
    activating a seismic source;
    after each activation of the source,
        receiving pressure wavefields and velocity wavefields from dual sensors of streamers towed by a survey vessel along sail lines of the survey;
        performing wavefield separation on the pressure wavefields and the velocity wavefields to generate up-going wavefields and down-going wavefields;
        generating a primaries image from the up-going wavefield and a multiples image from the up-going and down-going wavefields; and
    stacking the primaries images to generate a sail-line primaries image and the multiples images to generate a sail-line multiples image after traveling each sail line of the survey;
    stacking the sail-line primaries images to generate a composite primaries image and the sail-line multiples images to generate a composite multiples image; and
    summing the composite primaries image and the composite multiples image to generate a resultant three-dimensional image of the region of the subterranean formation.

2. The method of claim 1 further comprising storing the resultant three-dimensional image in the one or more data storage devices.

3. The method of claim 1, wherein the velocity wavefield further comprises a vertical velocity wavefield.

4. The method of claim 1, wherein performing wavefield separation further comprises transforming the pressure wavefields and vertical velocity wavefields from the space-time domain to the wavenumber-frequency domain and performing wavefield separation in the wavenumber-frequency domain.

5. The method of claim 1, wherein generating the primaries image further comprises applying a cross-correlation function of a down-going source wavefield that approximates a primary wavefield emitted from the source and the up-going wavefield.

6. The method of claim 1, wherein generating the primaries image further comprises applying a deconvolution function of a down-going source wavefield that approximates a primary wavefield emitted from the source and the up-going wavefield.

7. The method of claim 1, wherein generating the multiples image further comprises applying a deconvolution function of the up-going wavefield and the down-going wavefield.

8. The method of claim 1, wherein generating the primaries image and the multiples image further comprises
    transforming the up-going and down-going wavefields from a wavenumber-frequency domain to a space-frequency domain; and
    extrapolating the up-going wavefields and down-going wavefields with respect to depth in the space-frequency domain.

9. The method of claim 1, wherein summing the composite primaries image and the composite multiples image further comprises convolving the composite primaries image with a first filter and the composite multiples image with a second filter.

10. The method of claim 1 further comprising post processing the composite primaries image and the composite multiples image to correct for non-uniform receiver or streamer coverage of the subterranean formation during the survey.

11. The method of claim 1, wherein the sail lines further comprise one of straight sail lines, curved sail lines, circular sail lines, and non-linear sail lines.

12. A computer system for processing seismic data obtained from a marine survey of a subterranean formation, the system comprising:
    one or more processors;
    one or more data-storage devices; and
    a routine stored in one or more of the one or more data-storage devices and executed by the one or more processors, the routine directed to
        for each sail line of the marine survey,
            for each shot from a seismic source along a sail line,
                receiving pressure wavefields and velocity wavefields;
                performing wavefield separation on the pressure wavefields and the velocity wavefields to generate up-going wavefields and down-going wavefields; and
                generating a primaries image from the up-going wavefield and a multiples image from the up-going and down-going wavefields; and
            stacking the primaries images to generate a sail-line primaries image and the multiples images to generate a sail-line multiples image;
        stacking the sail-line primaries images to generate a composite primaries image and the sail-line multiples images to generate a composite multiples image;
        summing the composite primaries image and the composite multiples image to generate a resultant three-dimensional image of a region of the subterranean formation; and
        storing the resultant three-dimensional image in the one or more data-storage devices.

13. The system of claim 12, wherein the velocity wavefield further comprises a vertical velocity wavefield.

14. The system of claim 12, wherein performing wavefield separation further comprises transforming the pressure wavefields and vertical velocity wavefields from the space-time domain to the wavenumber-frequency domain and performing wavefield separation in the wavenumber-frequency domain.

15. The system of claim 12, wherein generating the primaries image further comprises applying a cross-correlation function of a down-going source wavefield that approximates a primary wavefield emitted from the source and the up-going wavefield.

16. The system of claim 12, wherein generating the primaries image further comprises applying a deconvolution function of a down-going source wavefield that approximates a primary wavefield emitted from the source and the up-going wavefield.

17. The system of claim 12, wherein generating the multiples image further comprises applying a deconvolution function of the up-going wavefield and the down-going wavefield.

18. The system of claim 12, wherein generating the primaries image and the multiples image further comprises
transforming the up-going and down-going wavefields from a wavenumber-frequency domain to a space-frequency domain; and
extrapolating the up-going wavefields and down-going wavefields with respect to depth in the space-frequency domain.

19. The system of claim 12, wherein summing the composite primaries image and the composite multiples image further comprises convolving the composite primaries image with a first filter and the composite multiples image with a second filter.

20. The system of claim 12 further comprising post processing the composite primaries image and the composite multiples image to correct for non-uniform receiver or streamer coverage of the subterranean formation during the survey.

21. The system of claim 12, wherein the sail lines further comprise one of straight sail lines, curved sail lines, circular sail lines, and non-linear sail lines.

22. A non-transitory computer-readable medium having machine-readable instructions encoded thereon for enabling one or more processors of a computer system to perform the operations of
for each sail line of a marine survey,
for each shot from a seismic source along a sail line,
receiving pressure wavefields and velocity wavefields;
performing wavefield separation on the pressure wavefields and the velocity wavefields to generate up-going wavefields and down-going wavefields; and
generating a primaries image from the up-going wavefield and a multiples image from the up-going and down-going wavefields; and
stacking the primaries images to generate a sail-line primaries image and the multiples images to generate a sail-line multiples image;
stacking the sail-line primaries images to generate a composite primaries image and the sail-line multiples images to generate a composite multiples image;
summing the composite primaries image and the composite multiples image to generate a resultant three-dimensional image of a region of the subterranean formation; and
storing the resultant three-dimensional image in the one or more data-storage devices.

23. The medium of claim 22, wherein the velocity wavefield further comprises a vertical velocity wavefield.

24. The medium of claim 22, wherein performing wavefield separation further comprises transforming the pressure wavefields and vertical velocity wavefields from the space-time domain to the wavenumber-frequency domain and performing wavefield separation in the wavenumber-frequency domain.

25. The medium of claim 22, wherein generating the primaries image further comprises applying a cross-correlation function of a down-going source wavefield that approximates a primary wavefield emitted from the source and the up-going wavefield.

26. The medium of claim 22, wherein generating the primaries image further comprises applying a deconvolution function of a down-going source wavefield that approximates a primary wavefield emitted from the source and the up-going wavefield.

27. The medium of claim 22, wherein generating the multiples image further comprises applying a deconvolution function of the up-going wavefield and the down-going wavefield.

28. The medium of claim 22, wherein generating the primaries image and the multiples image further comprises
transforming the up-going and down-going wavefields from a wavenumber-frequency domain to a space-frequency domain; and
extrapolating the up-going wavefields and down-going wavefields with respect to depth in the space-frequency domain.

29. The medium of claim 22, wherein summing the composite primaries image and the composite multiples image further comprises convolving the composite primaries image with a first filter and the composite multiples image with a second filter.

30. The medium of claim 22 further comprising post processing the composite primaries image and the composite multiples image to correct for non-uniform receiver or streamer coverage of the subterranean formation during the survey.

31. The medium of claim 22, wherein the sail lines further comprise one of straight sail lines, curved sail lines, circular sail lines, and non-linear sail lines.

* * * * *